March 3, 1970
C. L. HULTGREN
3,498,618
CHUCK AND COLLET ACTUATOR
Filed Oct. 18, 1967
4 Sheets-Sheet 2
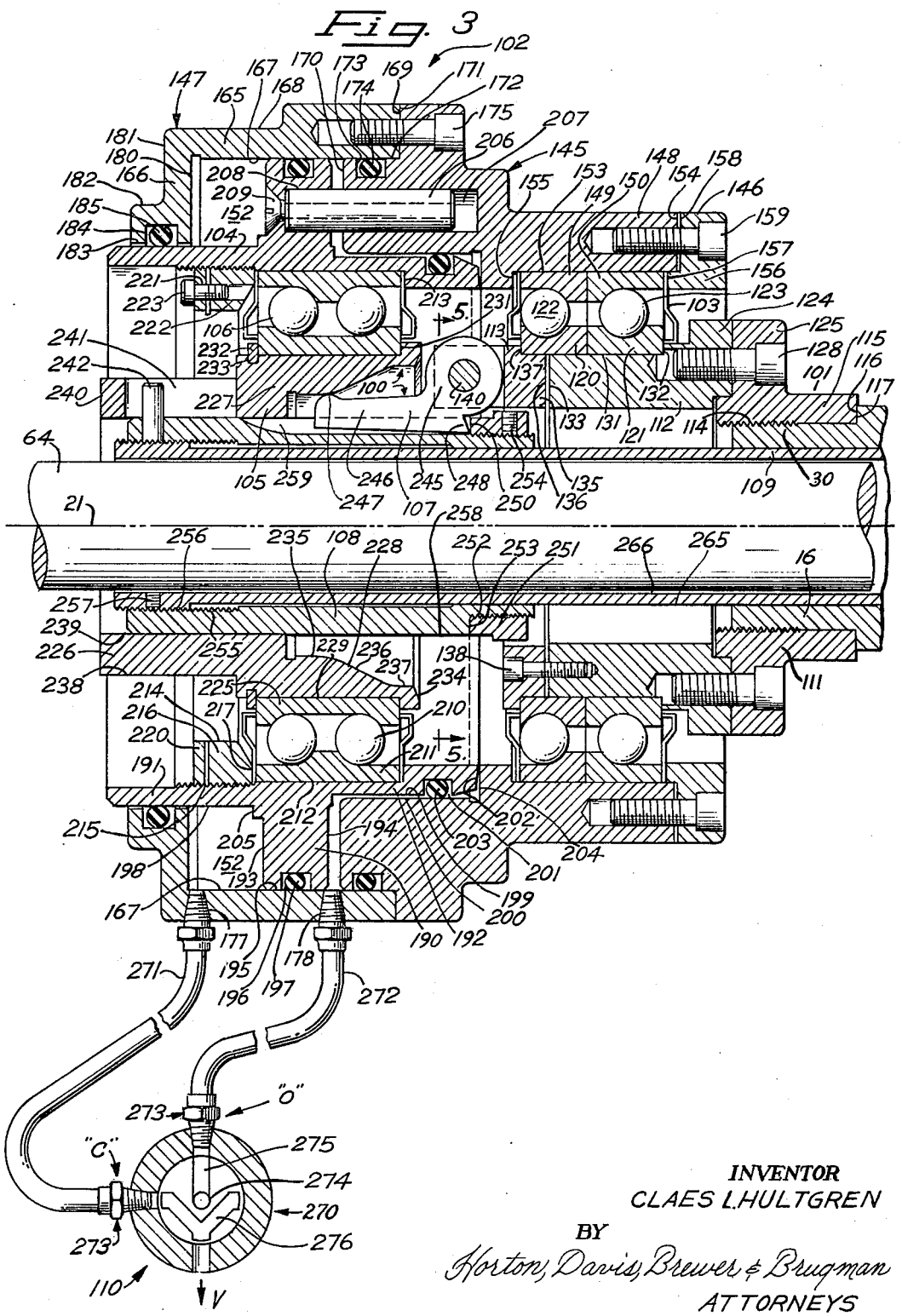
INVENTOR
CLAES L. HULTGREN
BY
Horton, Davis, Brewer & Brugman
ATTORNEYS

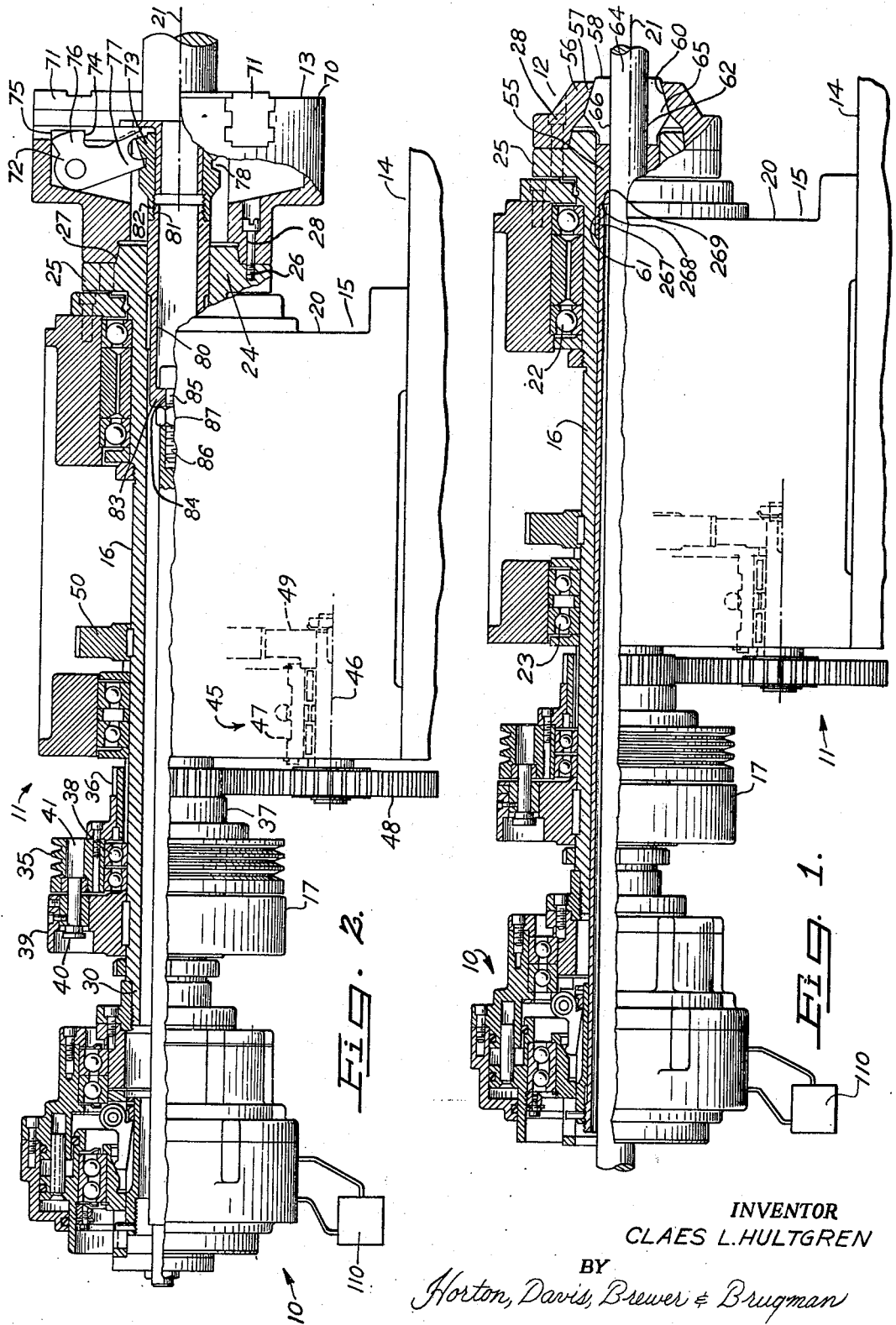

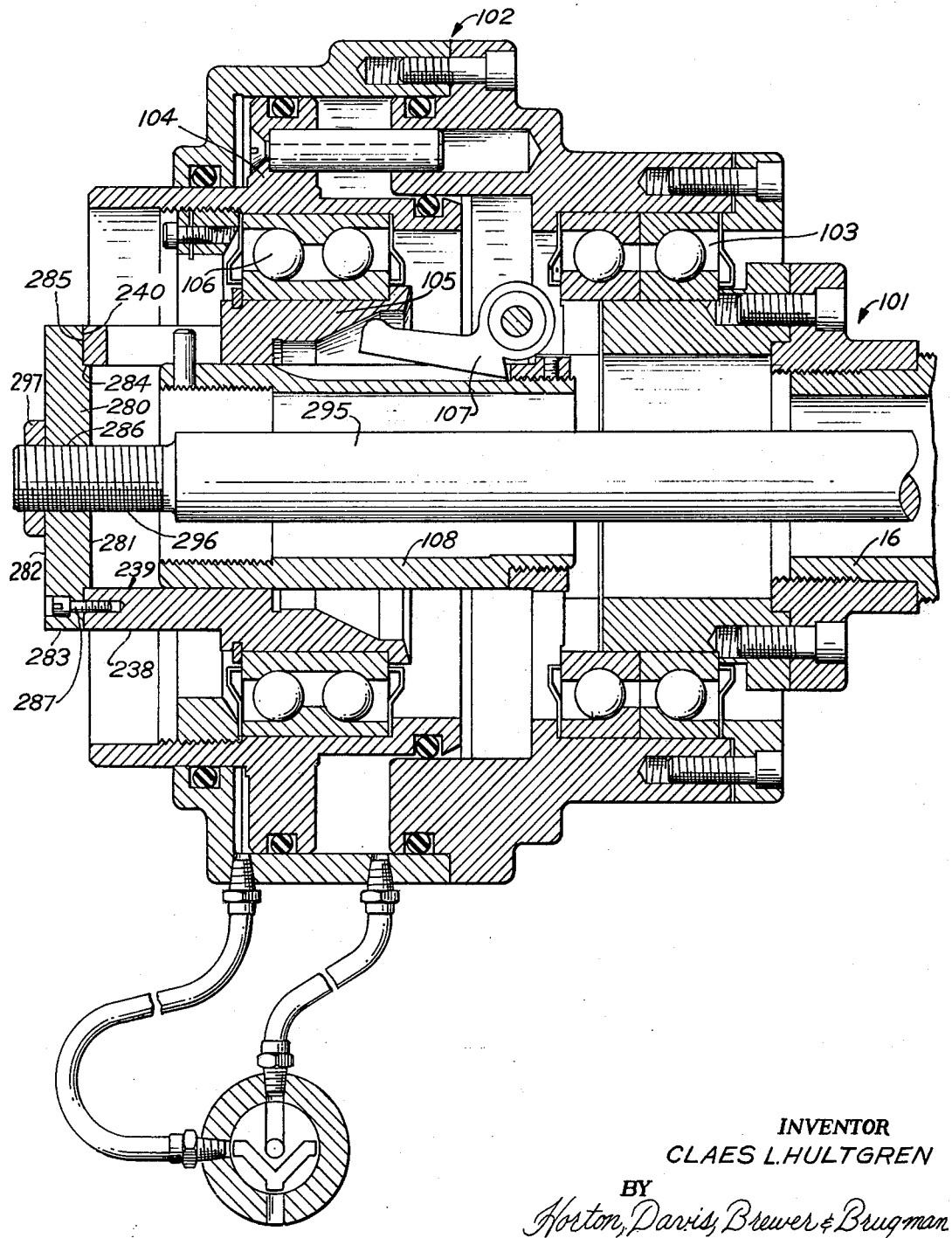

March 3, 1970  C. L. HULTGREN  3,498,618
CHUCK AND COLLET ACTUATOR
Filed Oct. 18, 1967  4 Sheets-Sheet 4

INVENTOR.
CLAES L. HULTGREN
BY
Horton, Davis, Brewer & Brugman
ATTORNEYS

United States Patent Office 3,498,618
Patented Mar. 3, 1970

3,498,618
CHUCK AND COLLET ACTUATOR
Claes L. Hultgren, Clarendon Hills, Ill., assignor to Logan Engineering Co., Chicago, Ill., a corporation of Illinois
Filed Oct. 18, 1967, Ser. No. 676,265
Int. Cl. B23b *31/30*
U.S. Cl. 279—4      8 Claims

ABSTRACT OF THE DISCLOSURE

An apparatus mounted on the outer end of the tubular spindle of a lathe for operating a plurality of different work holding means alternatively mountable on the inner end of the spindle, and having a rotationally isolated annular cylinder and piston operated by compressed fluid to produce an axial thrust which is transmitted directly, or through the interposition of a cam and bell crank thrust translating mechanism, to an associated connecting member extending through the spindle and attached to the work holding means to selectably inpress thereon a thrust corresponding to the produced thrust or a thrust having a substantially greater axial force component.

BACKGROUND OF THE INVENTION

The field to which this invention relates generally is that of machine tools, and more particularly this invention contemplates a versatile fluid operated actuator mountable on the spindle of a lathe for operating the several types of interchangeable spindle mounted work holding means used with lathes and known generally as chucks and collets.

Lathes are a well known class of machine tools in which a workpiece is rotated about a central axis and is machined by non-rotating cutting tool. Structurally, lathes in general comprise a supporting bed having a headstock mounted thereon at one end and a tool holding means which is movable along the remainder of the bed, the headstock mounting a rotatable elongated spindle which is drivable at selected speeds and which is arranged to to mount one of a plurality of interchangeable work holding means at its inboard end. The work holding means used with lathes are of two general types designated "chuck" and "collets." Further, while the chucks and collets in early use were manually opened and closed, in recent years chucks and collets have been developed which are operated by a centrally arranged draw member movable axially within the lathe spindle. It is with such chucks and collets that my present invention is adapted for use.

In order to assist the Patent Office in its examination of this application, several United States patents developed in a search of the files of the United States Patent Office are included below. These patents, which will also provide a basis for a brief description of the prior art related to my present invention, are:

Patent Nos. 728,572, May 1903, B. M. W. Hanson; 2,726,090, December 1955, T. E. Williams; 2,793,040, May 1957, C. T. Wilson; 2,814,496, November 1957, A. Damijonaitis; 2,886,007, May 1959, W. J. Manchester; 3,148,889, September 1964, J. Frei.

Considering the costly nature of machine tools and of the operators thereof, it is desirable to utilize as fully as possible the production potential of both the machine tool and its operator. In lathe type machine tools optimum production requires the use of the work holding means best suited for the materials, configuration and the type machining operation to be performed on individual or runs of like work pieces. Because engine and production lathes alike are adapted for a virtually unlimited number of different types of machining operations, it is necessary to use work holding means selected from numerous different chucks and collets in the every day operation of the lathe. For example, one run of workpieces having a recessed hub will be best gripped internally by a chuck having an appropriate range of jaw movement, while the next run of workpieces will comprise the machining of lengths of bar stock fed through the spindle of the lathe and cut into individual workpieces after machining, for which operation an appropriate size collet is best suited. The change from the use of the chuck to the collet is made at the expense of production, and hence it is desirable to minimize the change-over time. In this regard efficient use of the lathe requires that the actuator mechanism for operating the work holding means be adapted for use with the lathes full complement of chucks and collets, and that the desired changes from one to another be accomplished in a short period of time. A further consideration in providing the lathe with capacity for efficiently performing a wide range of machining operations is the necessity of providing a gripping force at the work holding means commensurate with the character of the workpiece to be machined. For example, the force required to hold a workpiece of tool steel may well crush a workpiece of a plastic material, and for a given workpiece, the cutting torque produced by a heavy rough cut will require a greater gripping force than for a light finish machining operation. Thus, it is also desirable that the actuator mechanism for operating the work holding means be arranged to selectably provide more than one work gripping force.

A careful examination of the above cited U.S. patents discloses that there was not available in the art, prior to my present invention, an actuating device having the above described qualities for a chuck and collet actuator.

Briefly, the devices disclosed in the hereinabove noted United States patents are arranged to produce a single axial thrust and are adapted for use with but one of the two types of work holding means necessary for use with lathes. The patent to Hanson, for example, discloses a collet actuator which is an integral part of the lathe with which it is used. It will be noted that in Hanson the spindle of the lathe itself is arranged for axial movement and is used to open and close the jaws of the collet 10. Further, the device disclosed in Henson is capable of producing a thrust in one direction only.

The device disclosed in the patent to Williams is arranged to produce an axial thrust of a single magnitude and in one direction to close the jaws of an associated collet. In Williams, a piston is employed to receive fluid pressure to produce an axial thrust in one direction and is returned to its first position by a plurality of springs.

The device disclosed in the patent to Wilson, while adapted for use with a standard lathe, is arranged to produce but a single axial thrust in one direction only to operate an associated collet. Specifically, Wilson teaches a fluid-operated device in which the fluid chamber is an elastic bag capable of expansion under pressure to move a pull tube 16 to close and open the jaws of the associated collet.

The patent to Damijonaitis discloses a fluid actuated chuck which is mounted on the inboard end of the spindle and is cited here to illustrate that in the prior art it was not contemplated to operate chucks by actuators mounted on the outboard end of the spindle, as has been done with collets. In Damijonaitis it will be noted that the cylinder, piston and all of the actuating elements of the fluid actuated chuck disclosed in that patent rotate conjointly with the spindle. This is contrary to the actuating mechanism of my present invention.

The collet actuator disclosed in the patent to Manchester, it will be noted, employs fluid pressure to operate a draw bar in two directions axially but, nevertheless, is capable of producing but a thrust of a single axial magnitude. Further, the outer housing 54 of Manchester, while non-rotative, is moved axially since the outer housing itself comprises the piston of that device.

The device disclosed in the patent to Frei employs a plurality of non-rotative pistons and cylinders which operate wedge-shaped cams to rotate associated bell cranks to produce an axial thrust of a single magnitude and in one direction only. As in all of the patents described above, the device of Frei is arranged for use with but one of the plurality of work holding means necessarily used with lathes.

SUMMARY OF THE INVENTION

It will be observed that none of the hereinabove disclosed United States patents, singly or in combination, teaches or suggests my present invention, the principal object of which is to provide a versatile and unitary actuator for use with a lathe, which device is arranged to operate all of the automatic work holding means available for use with the lathe by producing axial thrusts of at least two different magnitudes and selectably applicable to operate the work holding means whether the work holding means is of the push or pull type.

It is a further object of my present invention to provide a unitary and versatile chuck and collet operator which is rapidly and easily changed for use with the multitude of work holding means necessary for full utilization of the production potential of the lathe, and without removing the actuator from the lathe.

It is another object of my present invention to provide a unitary and versatile chuck and collet actuator having a selectably engageable force-multiplying means which is arranged to produce an axial thrust having a substantially greater axial force component than that produced by the piston mechanism of the device, and in which resistance to the thrust thus produced is transferred to and maintained by the lathe spindle upon completion of the incremental thrust producing portion of the cycle of the actuator.

These and other objects of this invention will become apparent from the following detailed description, when taken together with the accompanying drawings, in which:

FIG. 1 is an elevational view, partially in section, showing the actuator of my present invention attached to the spindle of a conventional lathe and arranged to operate a collet;

FIG. 2 is an elevational view, partially in section, showing the actuator of my present invention attached to the spindle of a conventional lathe and arranged to operate a power chuck;

FIG. 3 is an enlarged sectional view of the actuator of my present invention illustrating the mode of operation of the device when the force-multiplying means thereof is engaged;

FIG. 4 is a section view of the actuator of FIG. 3, illustrating the operation of the device with the force-multiplying means disengaged.

DESCRIPTION OF THE PREFERRED EMBODIMENT

Figure 5:
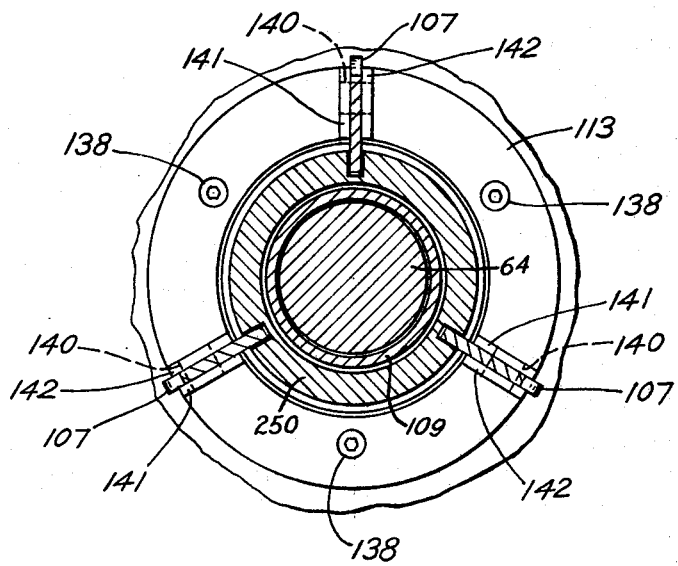
FIG. 5 is a view of the actuator of FIG. 3, taken along the lines 5—5 and looking in the direction of the arrows thereon.

The versatile chuck and collet actuator 10 of my present invention is illustrated at FIGS. 1 and 2 in conjunction with a lathe 11. At FIG. 1 the lathe 11 is arranged for a machining operation in which a collet 12 is used and the actuator 10 is arranged to operate the collet 12. At FIG. 2 the lathe 11 is alternatively arranged for a machining operation in which a power chuck 13 is used, and the actuator 10 has been converted to operate the power chuck 13.

While it will be readily appreciated that my present invention may be incorporated as an integral part of a lathe type of machine tool, the presently preferred embodiment, actuator 10, is arranged for use with a conventional engine lathe 11. Since engine lathes are a well-known and well defined type of machine tool, the lathe 11 will be described broadly and only to such an extent necessary to provide a proper understanding of my invention. Briefly, the lathe 11 comprises an elongated rigid bed 14, a portion of which only is shown at FIG. 1 and FIG. 2, which bed 14 provides support for the operable components of the lathe 11. The operable components include a headstock 15 having a rotatable spindle 16 to the inner end of which there is co-rotatively attached a work holding means such as the collet 12 or the power chuck 13, a power drive 17 for driving the spindle 16 and the work holding means at selectable speeds, and a tool means, not shown, for machining workpieces held in the work holding means.

The headstock 15 is attached to the bed 14 at one end thereof, and includes a housing 20 which provides support and shielding for the spindle 16 and a portion of the power drive 17. The spindle 16 is an elongated tubular steel member which extends beyond the confines of the housing 20 both at its inner and outer ends, and is supported for rotation about a central axis 21 by a pair of axially spaced thrust bearings 22 and 23 mounted within the housing 20 adjacent the inner and outer ends thereof respectively. As shown at FIGS. 1 and 2 the protruding inner end portion 24 of the spindle 16 includes a flange 25 having a plurality of threaded opening 26. The flange 25 provides a centering face 27 against which the chuck or collet is maintained in pressure contact by a plurality of cap screws 28 engaged through the collet or chuck and into threaded engagement with corresponding openings 26 in the flange 25. The portion of the spindle 16 which extends outwardly beyond the headstock 15 includes a threaded portion 30 at the outer extent thereof, which threaded portion 30 is adapted to receive lathe appurtenances. It is to this threaded portion 30 that the actuator 10 is removably attached.

The power drive 17 includes a rotating source of power, not shown, such as, for example, an electric motor or a power mandrel, and a drive pulley, also not shown, mounted on the output shaft of the power source. A driven pulley 35 is rotatably mounted on the outwardly extending portion of the spindle 16 between the housing 20 and the threaded portion 30. The pulley 35 includes an integral spur gear 36 on an axially extending portion 37 thereof, all of which are mounted on the spindle 16 by a thrust bearing 38. A companion clutch 39 is co-rotatably mounted on the spindle 16 in a position adjoining the pulley 35, and includes at least one slidable pin 40. The pulley 35 includes a socket 41 arranged to alternatively receive a portion of the pin 40, and when the pin 40 is engaged therein, driven rotational movement of the pulley 35 is transmitted directly to the spindle 16. However, when the pin 40 is withdrawn from the socket 41, the pulley 35 is free to rotate with respect to the spindle 16. In this position of the pin 40 a selectably engageable gear train 45 is provided to transmit driven rotation of the pulley 35 to the spindle 16. The gear train 45 includes a secondary shaft 46 mounted for rotation on a slidable bracket 47 and to which there is co-rotatably attached a pair of secondary gears 48 and 49. A driven gear 50 is co-rotatably attached to the spindle 16 intermediate its supporting thrust bearings 22 and 23, and the secondary gears 48 and 49 are arranged in corresponding aligned positions to selectably intermesh with the driven gear 50 and the driver spur gear 36 respectively. Thus, when the slidable bracket 47 is moved toward the spindle 16, the secondary gears 48 and 49 are brought into meshing engagement with the driven gear 50 and the driver spur gear 36, and driven rotative movement of the pulley 35 is transmitted through the gear train 45 to the spindle 16 at a proportionate rate and in the same direction. By removing the secondary gears 48 and 49 and using other interchangeable gears, not shown, having larger or smaller pitch diameters, the rate of rotation of the spindle 16 for a given pulley speed may be increased or decreased to suit a particular machining operation.

As stated above, the collet 12 and the power chuck 13 are alternatively and interchangeably mountable on the inner end portion 24 of the spindle 16 by the plurality of cap screws 28 which maintain the like seating portion of the collet 12 and the power chuck 13 in tight engagement with the centering face 27 of the flange 25. The collet 12, illustrated at FIG. 1, is typical of the class of work holding means known as collets, which class includes collets of both the push type and the pull type, expanding mandrels, and numerous specialty collets. All collets employ a sleeve having a work gripping portion and a tapered portion, the work gripping and tapered portions having common radially spaced longitudinally arranged slits permitting the individual segments separated by the slits to be moved radially outwardly and inwardly within a limited range of movement when a radially directed force is applied in an outward and inward direction respectively. While the segments are movable radially inwardly and outwardly, most collets, being made of a spring quality steel are arranged to be moved forcedly in one radial direction only, the return to the initial, or free configuration, occurring when the radial force is removed. The sleeve is disposed within a collar having a tapered portion conforming to the tapered portion of the sleeve. Relative movement between the collar and the sleeve operates to constrict the sleeve, and the radially inwardly directed component of the constricting force causes the sleeve segments to be moved inwardly to firmly grip a workpiece disposed therebetween. When the constricting force is relieved by relative movement of the collar and sleeve in the opposite direction, the segments spring back toward their free position and the workpiece may be removed from the collet. Specifically, the collet 12 is a push type of collet, and as shown at FIG. 1, comprises generally a sleeve 55 mounted for limited axial movement within a collar 56. The collar 56 is co-rotatably attached to the flange 25 of the spindle 16 by the cap screws 28, and includes an internal tapered portion 57 adjacent the outer end face 58 thereof. The sleeve 55 is an elongated tubular member having a conforming externally tapered portion 60 adjacent its outer end, and a threaded socket portion 61 adjacent its inner end. The sleeve 55 is provided with a continuous bore, the internal surface 62 thereof having a free inside diameter approximately ten one-thousandths inch greater than the outside diameter of the length of bar stock 64, which in the view of FIG. 1 is disposed therewithin. The sleeve 55 is provided with longitudinal slits 65 which extend inwardly from the outer end face 58 thereof beyond the tapered portion 60 to approximately the midpoint of the sleeve 55, thus dividing the outer end half of the sleeve 55 into several equal complementary longitudinal segments defining constrictable jaws. Forced movement of the sleeve 55 axially toward the collar 56, to the right as viewed at FIG. 1, operates to bring the external tapered portion 60 of the sleeve 55 into constricting engagement with the internally tapered portion 57 of the collar 56, and thereby force the segments of the sleeve 55 in a cantilevered manner toward and into pressure engagement with the outer surface 66 of the bar stock 64 at substantial portions of the bore 62 thereof. The degree of pressure engagement between the bore 62 and the outer surface 66 of the bar stock 64 being determined by the pitch of the tapered portions 57 and 60 and by the axial force applied to the sleeve and forcing it into constricting engagement with the collar 56. When the sleeve 55 is moved to the left, as viewed at FIG. 1, the constricting force thereon is relieved and the segments tend to return to their free configuration, thus withdrawing the engaged portions of the bore 62 from the outer surface 66 of the bar stock 64 so that the bar stock 64 may readily be shifted or removed from the collet 12.

The power chuck 13 is typical of the class of chucks arranged for automatic operation and which are well-known in the art. For purposes of description the chuck 13 is of the type which is closed to a work gripping position by an axially inwardly directed force, i.e., a pull type power chuck. However, the versatile actuator 10 is adapted to operate chucks of the push type as well. Briefly, as shown at FIG. 2, the power chuck 13 comprises a body portion 70 mounting three jaws 71 for radial movement, and three bell cranks 72 pivotally supported on the body 70 in positions corresponding with the three jaws 71 respectively and operable to move the jaws 71 through a limited range of radial movement in response to axial movement of a circumferentially grooved sleeve 73. The body portion 70 includes a seating portion conforming to the centering face 27 of the flange 25 of the spindle 16, and is co-rotatably supported thereon by the cap screws 28. Each of the jaws 71 includes a recessed portion defined by an inner wall 74 and an outer wall 75, the recessed portion being arranged to receive the crank arm 76 of the corresponding bell crank 72. The other crank arm 77 of each of the three bell cranks 72 is received in the circumferential grooved portion 78 of the grooved sleeve 73, so that axial movement of the grooved sleeve 73 produces a ratable corresponding radial movement of the jaws 71. Thus, when the grooved sleeve 73 is pushed in an outwardly direction, i.e., to the right as viewed at FIG. 2, the crank arms 76 bear concurrently against the outer walls 75 of the corresponding jaws 71 and thereby move the jaws 71 to their open position. Alternatively, when the grooved sleeve 73 is pulled inwardly, i.e., to the left as viewed at FIG. 2, the crank arms 76 bear concurrently against the inner walls 74 of the corresponding jaws 71, thereby moving the jaws 71 to their closed or work gripping position. The power chuck 13 further includes an adapter sleeve 80 defining generally a cup, and having an externally threaded portion 81 adjacent its open outer end at which it is adapted to threadedly receive the companion internally threaded end portion 82 of the grooved sleeve 73; the internally threaded portion 82 of the grooved sleeve 73 having the same dimensions and character as the threaded socket portion 61 of the sleeve 55 of the collet 12. The enclosed cup end 83 of the adapter sleeve 80 is provided with a threaded opening 84 through which there is threadedly inserted a bolt 85. The bolt 85 is arranged with its threaded shank portion 86 extending outwardly from the cup end 83 of the adapter sleeve 80, and is held in a desired axial relationship with the sleeve 80 by a lock nut 87.

It will be appreciated that the collet 12 and the power chuck 13 are actuated by forcedly moving the sleeve 55 and the grooved sleeve 73 respectively axially with respect to the spindle 16 and between a range of axial positions determined by the corresponding range of radial movement required of the work gripping jaws of the collet 12 and the power chuck 13. In general, however, power chucks, like power chuck 13, are arranged for a substantially greater range of jaw movement than are collets, such as collet 12, and for this reason an actuating force of a greater axial extent is required for power chucks than for collets. As will be described hereinafter, the versatile chuck and collet actuator 10 of my present invention is capable of furnishing the optimum axially directed actuating force for both types of work holding means.

Having thus described the general character and construction of the lathe 11, the collet 12 and the power chuck 13, each of which is typical of their respective class, the versatile chuck and collet actuator 10 will now be described structurally and operatively in association therewith. The actuator 10 is arranged to provide a range of axially directed forces through the spindle 16 of the lathe 11 from adjacent its threaded outer end 30 to the respective operating sleeve 55 and 73 of the collet 12 and the power chuck 13. For one portion of the range of axially directed forces the actuator 10 utilizes a force multiplying means, indicated generally by the numeral 100, and for the other portion of the range of axially directed forces the force multiplying means 100 is disengaged and the axial thrust of the device is transmitted directly to the operating sleeve of the work holding means then being used. The structure of the actuator 10 with the force multiplying means 100 in use is illustrated at FIG. 3, and at FIG. 4 the actuator 10 is shown arranged for direct transmission at its axial thrust. For purposes of illustrating the use of the arrangements of the actuator 10 of FIG. 3 and FIG. 4 with collets and power chucks, the actuator 10, arranged as at FIG. 3 with the force multiplying means 100 in use, is shown in use with collet 12 at FIG. 1, while at FIG. 2, the actuator 10, arranged for direct transmission of its axial thrust and corresponding to the arrangement of FIG. 4, is shown operatively connected to the power chuck 13. However, it will be understood that this arrangement has been selected to provide a broad basis for full disclosure and description of the actuator 10, and that the actuator 10 may be used in either of its described arrangements with the collet 12 or the power chuck 13.

Inasmuch as the rearrangement and substitution of components required to change the actuator 10 from force multiplying operation to direct transmission operation are minimal, the greater part of the structure of the actuator 10 as shown at FIG. 3 and FIG. 4 is identical. For this reason, a description of the actuator 10 of FIG. 3 is also a description of the actuator 10 arranged in the manner shown at FIG. 4, and hence, for purposes of description reference will be made primarily to FIG. 3. However, when describing the structure of the actuator 10 as arranged for direct transmission of its axial thrust, reference will be made to FIG. 4. Referring then to FIG. 3 and FIG. 1, it will be seen that the actuator 10 comprises generally a primary collar member 101 co-rotatably connected with the spindle 16 at the threaded portion 30 thereof, a cylindrical housing 102 disposed outwardly of the primary collar member 101 and interconnected therewith by first thrust bearing means 103, a flanged piston sleeve 104 cooperatively arranged for reciprocal movement within the cylindrical housing 102 and axially with respect to spindle 16, a cam ring 105 disposed radially inwardly of the flange piston sleeve 104 and interconnected therewith by second thrust bearing means 106, a bell crank 107 pin connected to the primary collar member 101, and adapted to ratably transmit axial movement of the cam ring 105 to a connecting sleeve 108, a push tube 109 extending between and conjointly interconnecting the connecting sleeve 108 and the sleeve 55 of the collet 12, and a controlled fluid pressure means 110 to remotely control the forced axial movement of the piston 104.

The primary collar 101 is conjointly attached to the spindle 16, and in this embodiment of my invention, is adapted to support the actuator 10 thereon. The primary collar 101 comprises an adapter mounting flange 111, a sleeve 112, and a retaining ring 113, all of which are rigidly interconnected in an axial relationship by a plurality of fastening means. The adapter mounting flange 111 is provided with an internally threaded portion 114 having threads corresponding to those of the outer threaded portion 30 of the spindle 16, and is threadedly engaged thereon. An axially extended cylindrical portion 115 of the mounting flange 111 terminates at an annular face 116 which is arranged to engage the shoulder 117 of the spindle 16 to position the mounting flange 111 and the actuator 10 axially with respect to the spindle 16.

The threads of the threaded portion 30 and the internally threaded portion 114 are arranged to maintain bearing engagement of the annular face 116 with the shoulder 117 when the spindle 16 is rotated in the direction in which machining is performed. It will be understood that the adapter mounting flange 111 may be formed to any desired configuration to adapt the actuator 10 for mounting on the spindle of the various types of machine tools with which the actuator 10 is adapted for use. The sleeve 112 is arranged to receive and support the inner races 120 and 121 of a pair of thrust bearings 122 and 123 respectively of the first thrust bearing means 103, and includes a flanged portion 124 at the outer end thereof arranged to mount a mating flanged portion 125 of the mounting flange 111. The sleeve 112 is rigidly supported on the mounting flange 111 by four cap screws 128. As shown at FIG. 3, the sleeve 112 includes an outer cylindrical portion 131 adapted to receive the inner races 120 and 121 in a press fit relationship. The cylindrical portion 131 extends axially from a shoulder 132, against which the inner race 121 is pressed, to an outer end face 133 spaced inwardly away from the outer face of the inner race 120. Thus, approximately one-half of the axial extent of the inner race 120 is mounted on the cylindrical portion 131, the other one-half of the axial extent of the inner race 120 extending beyond the outer end face 133 of the cylindrical portion 131. The retaining ring 113 includes a cylindrical stub portion 135 which has a diameter the same as that of the cylindrical portion 131 and which is received within the socket defined by the overhanging one-half of the inner race 120. The stub portion 135 includes an outer annular end face 136 and a radially extending shoulder 137 adapted to bearingly engage the outer face of the inner race 120. The axial extent of the stub portion 135 is slightly less than axial extent of the overhanging portion of the inner race 120, so that the end face 136 of the stub portion 135 is slightly spaced from the outer end face 133 of the sleeve 112 when the inner races 120 and 121 are pressed tightly together between the shoulders 137 and 132 of the retaining ring 113 and sleeve 112 respectively. The retaining ring 113 is drawn toward and into a rigid interconnection with the sleeve 112 by three cap screws 138 which are engaged through counterbored holes provided in the retaining ring 113, and into tight threaded engagement with corresponding threaded openings provided in the sleeve 112. As thus arranged, the inner race 120 serves to concentrically position the retaining ring 113 with respect to the sleeve 112 and the thrust bearings 122 and 123.

As shown at FIG. 3 and FIG. 5, the retaining ring 113 also mounts the three bell cranks 107 of the force multiplying means 100. The bell cranks 107 are arranged for limited pivotal movement about tangentially oriented axes, and in respective planes passing through the common central axis 21 of the spindle 16 and disposed equiangularly thereabout. As thus arranged, the bell cranks 107 are corotatably interconnected with the spindle 16, and their respective pivotal axes are fixed axially with respect to the spindle 16 through the primary collar member 101. Each of the three bell cranks 107 is pivotally mounted in a like manner by a pin 140 which extends laterally therethrough and is supported at its opposite end portions by a pair of circumferentially spaced tabs 141 and 142 respectively, which extend axially outwardly from the retaining ring 113. Each bell crank 107 is provided with a laterally arranged circular opening therethrough adapted to receive the corresponding pin 140 therethrough for relative free rotative movement. The tabs 141 and 142 are provided with corresponding laterally aligned circular openings to receive the respective opposite end portions of the pin 140 in a press fit relationship and are spaced apart a distance slightly greater than the thickness of the bell cranks 107 to restrain the associated bell crank 107 from lateral movement while permitting the bell crank 107 to move freely in a pivotal manner about the pin 140. Since the bell cranks 107 and their respective mountings are corotatably attached to the spindle 16, and therefore are subject periodically to rotation at high speeds, the three bell cranks 107 and their associated mountings are dynamically balanced by carefully forming the components so that the total mass distribution of each is equal. The pins 140 are formed of hardened steel to provide a durable bearing surface upon which the associated bell crank 107 is free to pivot.

The cylindrical housing 102 is mounted on the primary collar member 101 by the first thrust bearing means 103 which serves to support the cylindrical housing 102 and to rotatively isolate the cylindrical housing 102 from rotation of the primary collar member 101 while maintaining a fixed axial relationship therebetween. As thus mounted, the cylindrical housing 102 does not rotate with the spindle 16, now does it move axially with other parts (to be described hereinafter) of the actuator 10. The stationary character of the cylindrical housing 102 serves several purposes, among which are; to provide a non-moving cylinder in which the flanged piston sleeve 104 is moved reciprocally without being subjected to extraneous dynamic forces; to provide a stationary terminal for the fluid bearing conduits of the controlled fluid pressure means 110, and to shield the moving parts of the device. For ease of manufacture and maintenance, the cylindrical housing 102 is formed of three rigidly interconnected parts, viz, a central portion 145, a ring 146 and a cupped sleeve 147. An axially extending portion 148 of the central portion 145 and the ring 146 serve to receive and retain the outer races 149 and 150 of the bearings 122 and 123 respectively. The cupped sleeve 147 is attached to the opposite end of the central portion 145 and together they form a fluid receiving chamber 152. The axially extending portion 148 has a cylindrical inner wall 153 having an axial extent approximately one-eighth inch more than the total axial extent of the outer races 149 and 150, and extends continually between the end face 154 of the axially extending portion 148 and a radially inwardly extending shoulder 155. The cylindrical inner wall 153 is formed to receive the outer races 149 and 150 in a light press fit, and the outer races are positioned thereon with the end face of the outer race 149 bearingly engaged against the shoulder 155. As thus arranged, the outer race 150 terminates axially approximately one-eighth inch inwardly of the inner end face 154. The outer race 150 is held in place by the ring 146 which includes an annular protrusion 156 which is received within the overhanging portion of the outer race 150. The axial extent of the protrusion 156 is slightly greater than the extent of axial recess defined by the outer race 150, so that when the annular face 157 of the protrusion 156 is bearingly engaged against the end face of the outer race 150, the annular mating face 158 of the ring 146 is slightly spaced from the associated inner end face 154 of the central portion 145. The ring 146 is drawn into tight bearing engagement by six circumferentially spaced cap screws 159 which are engaged through appropriate openings in the ring 146 and into threaded engagement with corresponding threaded openings provided in the axially extending portion 148 of the central portion 145.

The cupped sleeve 147 includes a cylindrical sleeve portion 165 and an integral flange portion 166. The cylindrical sleeve portion 164 has a cylindrical inner wall 167 and a spaced outer wall 168 which terminates at an annular end face 169. The central portion 145 is provided with a circumferential recess adjacent its outer end face 170 to receive the end of the sleeve 147 thereon adjacent end face 169. This recess is defined by annular shoulder 171 and a generally cylindrical portion 172 which extends axially between the annular shoulder 171 and the outer end face 170, of central portion 145. The cylindrical portion 172 is formed to concentrically receive the cylindrical inner wall 167 thereabout, and is provided with an annular groove 173 in which an "O" ring 174 is disposed for sealing the junction therebetween. The cupped sleeve 147 is fastened to the central portion 145 by six cap screws 175 which extend through appropriate circumferentially spaced holes provided in the central portion 145, and into tight threaded engagement with corresponding threaded openings provided in the cylindrical sleeve portion 165 to maintain tight bearing engagement between the annular end face 169 and the annular shoulder 171. A pair of axially spaced tapped openings 177 and 178 bearing one-eighth inch N.P.T. threads are provided through the cylindrical sleeve portion 165 for communication of fluid under pressure to the fluid receiving chamber 152. The tapped opening 177 is disposed closely adjacent the flange portion 166, and the tapped opening 178 is disposed closely adjacent the junction of the cylindrical sleeve portion 165 with the outer end face 170 of the central portion 145. As thus arranged, the tapped openings 177 and 178 are respectively in registry with the minimum end chamber portions defined between the piston portion of the flanged piston sleeve 104 and the opposite end walls of the fluid receiving chamber 152.

The flange portion 166 of the cupped sleeve 147 is defined by an annular inner wall 180, a spaced outer wall 181 having a raised boss portion 182 adjacent the radial inner extent thereof, and a generally cylindrical bore 183 interjoining the inner wall 180 and the boss portion 182. The cylindrical bore 183 is provided with a groove 184 for receiving and retaining an "O" ring 185, which "O" ring seals the junction between the cylindrical bore 183 and the flanged piston sleeve 104 which moves reciprocally thereacross during operation of the actuator 10. As shown at FIG. 3, the cylinder portion of the fluid receiving chamber 152 is defined by a pair of axially spaced end walls comprising the outer end face 170 of the central portion 145 and the annular inner wall 180 of the cupped sleeve 147, and by an interconnecting cylindrical wall comprising the portion of the cylindrical inner wall 167 of the cupped sleeve 147 extending axially from the annular inner wall 180 thereof to the junction with central portion 145.

The flanged piston sleeve 104 is arranged for cooperative reciprocal movement within the fluid receiving chamber 152. As best seen at FIG. 3, the flanged piston sleeve includes a flanged piston portion 190 against which fluid pressure is directed to move the flanged piston sleeve 104 axially toward and away from the collet 12, and elongated sleeve portions 191 and 192 extending axially on either side of the flanged piston portion 190 which form a continuous enclosure for the inner cylindrical portion of the fluid receiving chamber 152 as the flanged piston sleeve 104 is moved reciprocally thereacross. The flanged piston portion 190 is disposed in the fluid receiving chamber 152, and is defined by a pair of axially spaced annular piston faces 193 and 194 and a peripheral wall 195 which extends between and interjoins the outer extents of the faces 193 and 194. The piston faces 193 and 194 present similar annular surfaces to the fluid which is directed under pressure and alternately thereagainst to force the flanged piston sleeve 104 axially in directions respectively toward and away from the collet 12. The peripheral wall 195 has an outside diameter slightly less than the inside diameter of the cylindrical inner wall 167 of the cupped sleeve 147 and is adapted for sliding movement with respect thereto. A groove 196 is provided in the peripheral wall 195 and in which an "O" ring 197 is disposed for sealing the sliding junction between the peripheral wall 195 and the cylindrical inner wall 167. The sleeve portions 191 and 192 extend integrally from the piston portions 190 and successive portions of the cylindrical outer surfaces 198 and 199 respectively thereof define the inner wall of the fluid receiving chamber 152. The cylindrical outer surfaces 198 of the sleeve portion 191 has a diameter slightly less than the cylindrical bore 183 of the cupped sleeve 147 and is arranged for sliding movement with respect thereto, the sliding junction therebetween being sealed by the "O" ring 185. The cylindrical outer surface 199 of the sleeve portion 192 is arranged for sliding movement within a conforming internal cylindrical wall 200 of the central portion 145. A groove 201 is provided inwardly adjacent the end face 202 of the sleeve portion 192, and an "O" ring 203 is disposed therein for sealing the sliding junction between the cylindrical outer surface 199 and the internal cylindrical wall 200. Axial movement of the flanged piston sleeve 104 is limited in the direction toward the collet 12 by the engagement of the end face 202 of the sleeve portion 192 with a shoulder 204 at the inner extent of the internal cylindrical wall 200. Axial movement of the flanged piston sleeve in the direction away from the collet 12 is limited by the engagement of the annular face 205 of a shoulder portion formed at the base of the piston face 193 with the annular inner wall 180 of the fluid receiving chamber 152. In order to maintain the flanged piston sleeve 104 in a nonrotative relationship with the cylindrical housing 102 three circumferentially spaced positioning pins 206 (one only of which is shown) are fastened to the flanged portion 190 and extend slidably into conforming openings 207 provided in the central portion 145 of the cylindrical housing 102. One end portion of each of the pins 205 is disposed in a conforming socket 208 in the flanged piston portion 190. A machine screw 209 is engaged through an appropriate opening extending through the flanged piston portion 190 in registry with each of sockets 208 and into threaded engagement with a concentric threaded opening provided in the end portion of each pin 206 to secure the pins 206 in their associated sockets 208. Since the cylindrical housing 102 and the flanged piston sleeve 104 are rotatively stationary, and independent of rotation of the spindle 16, these components need not be of balanced construction and their axial thrust producing effect is the sole consideration in their design.

It will be understood that by arranging the cylindrical housing 102 and the associated flanged piston 104 as thus described that the thrust producing function of these primary drive elements may also be accomplished by mechanical means. However, the described fluid pressure means is presently preferred for its simplicity, speed and ready availability of compressed air in those facilities where lathes are employed.

The axial thrust of the flanged piston sleeve 104 is produced by the alternate introduction of fluid under pressure into the portions of the fluid receiving chamber 152 at the opposite piston faces 193 and 194 of the piston portion 190. This non-rotative axial thrust is transmitted to the rotative cam ring 105 by the second thrust bearing means 106 which interconnects the flanged piston sleeve 104 and the cam ring 105. The second thrust bearing means 106 includes a double thrust bearing 210, the outer race 211 of which is received and retained within a cylindrical wall 212 formed on the inner portions of the sleeve portions 191 and 192. The outer race 211 is restrained from axial movement by an inwardly extending shoulder 213 at the inner end of the cylindrical wall 212, and at the outer end of the cylindrical wall 212 by an externally threaded retaining ring 214. The retaining ring 214 is threadedly engaged in an associated internally threaded portion 215 outwardly adjacent the cylindrical wall 212 of the flanged sleeve 104. The retaining ring 214 is constructed of two exteriorly threaded ring parts comprising a first ring 216 having an annular face 217 which is tightly engaged against the outer face of the outer race 211, and a locking ring 220 which is disposed in an operative position spaced axially slightly away from the first ring 216. Three circumferentially spaced holes 221 are provided through the locking ring 220 and corresponding threaded openings 222 through the outer face 217 are provided in the first ring 216. A cap screw 223 is engaged through each of the holes 221 and into tight engagement with an aligned threaded opening 222 to draw first ring 216 and the locking ring 220 toward one another, thereby to restrain the first ring 216 from threaded movement away from the outer race 211.

The inner race 225 of the double thrust bearing 210 is mounted on the cam ring 105. As thus interconnected by the double thrust bearing 210, the cam ring 105 is rotatively isolated from the flanged piston sleeve 104 while responding directly to the forced axial movement thereof. The cam ring 105 is a generally tubular member having an outer end portion 226 which defines a sleeve, and an inner end portion 227 which includes internally a cam surface 228 and externally a peripheral portion 229. The peripheral portion 229 is arranged to receive the inner race 225 which is restrained from axial movement therealong by a shoulder 231 at one end thereof and by a garter clip 232 which is fitted into a conforming groove 233 adjacent the other end of the peripheral wall 230. The cam surface 228 extends axially inwardly of the cam ring 105 from the inner end face 234 thereof and includes three circumferential portions 235, 236 and 237 of different radial extent. The total axial dimension of the cam surface 228 is slightly greater than the length of the axial traverse of the cam ring 105. The circumferential portions 235 and 237 are substantially cylindrical, the portion 235 having a lesser radial extent than the portion 237. The portion 235 produces a closed disposition of the collet 12, and the portion 237 produces an open disposition of the collet 12. The circumferential portion 236 is curvilinear and interconnects the portions 235 and 237 to produce a smooth transition radially and axially therebetween. The cam surface 228 receives the follower portion 247 of the finger 246 of each of the bell cranks 107 in a sliding relationship, and for this reason the cam surface 228 is metallurgically treated to provide a durable surface and is machined to a fine finish to minimize resistance to this sliding movement. The outer end portion 226 of the cam ring 105 includes an outer cylindrical wall 238, an inner cylindrical wall 239 and terminates outwardly at a planar annular end face 240. The inner cylindrical wall 239 is engaged in a sliding relationship with an associated external portion of the connecting sleeve 108, and an axially extending slot 241 provided in the outer end portion 226 is adapted to receive, in a corresponding sliding relationship, a pin 242 fixed to the connecting sleeve 108. In this manner the cam ring 105 and the connecting sleeve 108 are maintained in a corotative and axially slidable relationship which permits the cam ring 105 to travel through its axial traverse while the connecting sleeve 108 is moved corotatively through a relatively shorter axial traverse.

In the arrangement of the actuator 10 illustrated at FIG. 1 and FIG. 3, the thrust produced by the primary drive elements is transmitted to the push tube 109 and the collet 12 through the intermediate use of the force multiplying means 100. In the arrangement of the actuator 10 illustrated at FIG. 2 and FIG. 4, the forced axial movement of the cam ring 105 is transmitted directly to the power chuck 13, and the force multiplying means 100 is not used. The latter arrangement of the actuator 10 will be more fully described hereinafter, while the following is a description of the force multiplying means 100. The cam surface 228, the bell cranks 107 and the connecting sleeve 108 generally comprise the force multiplying means 100 which serves to translate the forced axial movement of the cam ring 105 to an axial movement of the push tube 109 of a substantially greater force and a correspondingly lesser axial extent. The push tube 109 transmits the increased thrust directly to the collet 12 to push the sleeve 55 into its closed position in the collar 56 and thereby grip the bar stock 64 therewithin for a machining operation. As described hereinbefore, each of the bell cranks 107 is mounted for limited pivotal movement about their respective supporting pins 140. Each bell crank includes a hub portion 245 from which there extends a finger 246 having a follower portion 247 at the outer end thereof and a heel portion 248 adjacent the hub portion 245 at the inner end thereof. In this embodiment of my present invention, the lever arm of the follower portion 247 is approximately three times the length of the lever arm of the heel portion 248 and provides a mechanical advantage of three. In addition, the radial difference between circumferential portions 235 and 237 of cam surface 228, and concomitantly, the radial deflection of the follower portion 247 produced by the cam surface 228 as the cam ring 105 is moved through its traverse is approximately one-third of the length of the cam ring 105 traverse and provides a further mechanical advantage of three. Thus, the combined mechanical advantage of the bell cranks 107 and the cam surface 228 is approximately nine. This mechanical advantage is applied by the heel portion 248 of the three bell cranks 107 against the annular face 250 of a collar 251 which forms a part of the connecting sleeve 108. The collar 251 is an internally threaded ring member which is threaded along its internal axial extent, and is engaged on an associated threaded end portion 252 of the connecting sleeve 108. The threaded end portion 252 is stepped down to receive the collar 251 as a substantially continuous part of the connecting sleeve 108, and includes a shoulder 253 at its inner extent and against which the annular face 250 of the collar 251 is abuttingly engaged. The collar 251 is maintained in its position on the threaded end portion 252 by a set screw 254 which is engaged through a threaded hole provided therefor in the collar 251 and bearingly engaged with the threaded end portion 252. The connecting sleeve 108 is interconnected at its other end with the push tube 109 by mating threaded portions 255 and 256 formed internally and externally respectively thereon. The axial extent of the internal threaded portion 255 of the connecting sleeve 108 is longer than that of the associated external threaded portion 256 of the push tube 109, so that the relative position of the connecting sleeve 108 may be adjusted with respect to push tube 109 and the collet 12. The connecting sleeve 108 is maintained in a desired axial threaded relationship with the push tube 109 by means of a set screw 257 which is engaged through a threaded opening provided therefor in the externally threaded portion 256 of the push tube 109, and which bears radially outwardly against the internal threaded portion 255 of the connecting sleeve 108. Externally the connecting sleeve 108 is formed with a continuous cylindrical wall 258 which is arranged for closely fitted axially slidable movement within the inner cylindrical wall 239 of the cam ring 105, and thus the connecting sleeve 108 serves to maintain a co-axial relationship between the cam ring 105 and the push tube 109. As shown at FIG. 3, an elongated slot 259 is formed in the cylindrical wall 258 to receive the outer longitudinal portion of the finger 246 of each of the three bell cranks 107. The slots 259 extend from adjacent the internally threaded portion through the shoulder 253 of the stepped down portion and expose three corresponding portions of the annular face 250 of the collar 251 as anvils to receive the heel portions 248 of the three bell cranks 107. Since the bell cranks 107, the cam ring 109, the connecting sleeve 108, and the push tube 109 are corotatively interrelated, the slots 259 and the associated fingers 246 retain their alignment during operation of the device.

Referring to FIG. 1, and FIG. 3 it will be observed that the push tube 109 is an elongated tubular member which extends through the spindle 16 to interconnect the connecting sleeve 108 and the sleeve 55 of the collet 12 for conjoint axial and rotative movement. The outside wall 265 of the push tube 109 has a diameter slightly less than the inside diameter of the spindle 16 and is arranged for guided axially slidable movement therewithin. It will be understood, however, that it is not necessary that the push tube 109 be so arranged, for it is merely a matter of design to form a push tube which will maintain itself without deflection between the actuator 10 and the collet 12 and without additional support from the inside walls of the spindle 16. In fact, in the arrangement of the actuator 10 illustrated at FIG. 2 and FIG. 4 a solid push rod is used to actuate the power chuck 13. In this embodiment of my present invention the closely fitting tubular push tube 109 is used to provide a maximum central axial opening within the inside wall 266 thereof to receive extended lengths of bar stock therethrough for cut off machining operations. The inner end portion 267 of the push tube 109 is provided with external right-hand threads which conform with the threads of the threaded socket portion 61 of the collet 12, and the inner end face 268 of the push tube 109 is arranged to engage an inwardly extending circumferential shoulder 269 of the threaded socket portion 61 as a positioning stop when the push tube 109 and the sleeve 55 are assembled. The direction of rotation of standard lathes, of which lathe 11 is typical, operates to drive the threaded inner end portion 267 of the push tube 109 into the threaded socket portion 61 and axially toward the shoulder 269 thereof, so that the inner end face 268 of the push tube 109 is tightly engaged against the shoulder 269 of the sleeve 55 and thereby a conjoint axial and rotative relationship is maintained between the push tube 109 and the sleeve 55.

As thus interconnected, the forced axial movement or thrust, developed by the non-rotating flanged piston sleeve 104, is transmitted to the corotating cam ring 105, bell cranks 107, and push tube 109 to apply a proportionally greater axial force to the sleeve 55 of the collet 12. The increased axial thrust thus imposed on the sleeve 55 operates to drive the tapered portion 60 thereof into the corresponding tapered portion 57 of the collar 56 and thereby constrict the slit portion of the sleeve 55 to a reduced internal diameter to grip the bar stock 64 for a machining operation. Upon release of the axial force holding of the slit externally tapered portion 60 constrictingly within the collar 56, the slit segments tend to return to their unconstricted configurations, and in doing so produce a reverse axial thrust by pressing outwardly against the internally tapered portion 57 of the collar 56. This reverse axial thrust is transmitted by the push tube 109 and the connecting sleeve 103 to the heel portion 248 of the three bell cranks 107 and thereby maintains the follower portion in camming engagement with the cam surface 228 during the release, or jaw opening, portion of the traverse of the flanged piston sleeve 104. As stated hereinbefore, the actuator 10 is adapted for operation during continuous rotation of the spindle 16. In this regard, it will be observed that the center of gravity of the bell cranks 107 is located in the fingers 246 thereof, so that rotation of the bell cranks 107 about the central axis 21 produces a resultant outward force on each of the bell cranks about their respective mounting pins 140, thus aiding in maintaining the follower portion 247 in bearing engagement with the cam surface 228.

The controlled fluid pressure means 110 of this embodiment of my present invention utilizes compressed air as its fluid. While other fluids may be effectively used, compressed air is most often available as a standard component of plants in which lathes are used. Hence, no special provision need be made to provide a source of compressed fluid for the device, and any conveniently available outlet in the compressed air system may be tapped for this purpose. Referring to FIG. 3, it will be seen that the controlled fluid pressure means 110 includes a conventional three-way valve 270 to which compressed air is supplied (source not shown) and a pair of flexible air hoses 271 and 272 which interconnect the ports "C" and "O" of the three-way valve 270 and the tapped openings 177 and 178 respectively. The hoses 271 and 272 are provided with like threaded couplings 273 at their ends for threaded connection with tapped openings 177 and 178 and with the corresponding ports "C" and "O." The three-way valve 270 is arranged to receive a supply of air through a central passage 274 and to distribute the compressed air through a connecting lateral passage 275 selectably and alternately to ports "C" and "O," port "C" designating the port receiving compressed air to close the collet 12 and port "O" designating the port receiving compressed air to open the collet 12. The plug portion of the three-way valve 270 includes a further passage 276 having a "Y" configuration and serving alternately to interconnect the one of the ports "C" and "O" not receiving air under pressure with the venting port "V." The three-way valve 270 is thus operable to selectably and alternately introduce compressed air to the portion of the fluid receiving chamber 152 at the opposite faces 193 and 194 of the piston portion 190, and concurrently to provide an exhaust passage from the opposite portion of the fluid receiving chamber 152 and which is open to the atmosphere. As described hereinbefore, movement of the flanged piston sleeve 104 to the right, as viewed at FIG. 3, operates the collet 12 to a closed position, and conversely, movement to the right opens the collet 12. The controlled fluid pressure means 110 is operable remotely by moving the three-way valve 270 to introduce compressed air through port "C" to apply fluid pressure to the fluid receiving chamber 152 and against the piston face 193 to forcedly move the flanged piston sleeve 104 axially to the right to close the collet 12, and alternately by moving the three-way valve 270 to introduced compressed air through port "O" and thereby against the piston force 194 to forcedly move the flanged piston sleeve 104 to the left to open the collet 12.

From the foregoing structural and functional description of my present invention, the following general characteristic thereof will be readily understood. First, the spindle 16 not only mounts the actuator 10, but also provides an axial anchor which receives equally and oppositely the thrust developed by the actuator 10 to close the work holding means, i.e. the collet 12 and alternatively the power chuck 13. Secondly, the axial thrust produced by the actuator 10 is developed by fluid under pressure acting actively and reactively between the flanged piston sleeve 104 and the cylinder defining cylindrical housing 103. Third, the axial thrust thus developed is impressed directly on the cam ring 105 by the second thrust bearing means 106, the flanged piston sleeve 104 and the cylindrical housing 103 being maintained non-rotative by, the isolating second bearing means 106 and 103 respectively. Fourth, any thrust impressed upon the cam ring 105 to overcome the resistance of the work holding means to movement to a work gripping position is shared equally and oppositely by the first and second thrust bearing means 103 and 106 respectively. And, fifth, the developed thrust impressed upon the cam ring 105 may selectably be transmitted directly to the operating mechanism of the work holding means, or alternatively, the force multiplying means 100 may be interposed therebetween to substantially increase the axial force component of the thrust transmitted to the work holding means.

With the forgoing characteristics in mind, it will be appreciated that when, as in the arrangement of the actuator 10 illustrated in FIG. 1 and FIG. 3, the force multiplying means 100 is operatively engaged to impress an axial force on the collet 12 which is approximately nine times the axial force developed by the flanged piston sleeve 104, the increased force is active against the anchoring reference support of the spindle 16. However, reference to the above enumerated characteristics and to FIG. 3 will disclose that the increased axial force is not operative on either the first or second thrust bearing means 103 and 106 respectively. The maximum thrust imposed on the first and second thrust bearing means 103 and 106 respectively is the predetermined thrust developed by a controlled fluid pressure acting against the fixed area piston faces 193 and 194, regardless of whether the force multiplying means 100 is used or not. It will be observed by an examination of the device at FIG. 3 that the increased axial force developed by the cam surface 228 operating on the bell cranks 107 is applied by the heel portion 248 of the bell cranks 107 against the annular face 250 of the connecting sleeve 108, and that each of the three bell cranks 107 is mounted by its associated pin 140 on the primary collar member 101, which member is rigidly attached to the spindle 16. Thus, the force reactive to the increased force applied by the heel portion 248 is imposed substantially on the pins 140 acting as fulcrums for the three bell cranks 107 and is borne by the spindle 16 independently of the bearings, piston and cylinder of the actuator 10. In addition, the cam surface 228 of the force multiplying means 100 is arranged to present a substantially cylindrical surface, i.e. circumferential portion 235, to the follower portion 247 of the bell cranks 107 when the cam ring 105 has been moved axially to its limit position corresponding to a closed disposition of the collet 12. As thus arranged, the camming force exerted upon the follower portion 247 by the circumferential portion 235 of the cam surface 228 is entirely radial and has no axial component, thereby removing the thrust load from both the first and second thrust bearing 103 and 106. Thus, in addition to the fact that the first and second thrust bearing means 103 and 106 respectively are never subjected to a greater axial thrust load greater than the predetermined maximum thrust developed by the flanged piston sleeve 104, when the force multiplying means 100 is used, this axial thrust load is borne by the first and second thrust bearing means 103 and 106 respectively only during the very short incremental period required to close and lock the collet 12. During the machining portion of the cycle of operation of the lathe 11 and the actuator 10, there is no axial thrust load on the first and second bearing means 103 and 106.

Referring now to the arrangement of the actuator 10 illustrated at FIG. 2 and FIG. 4 it will be observed that the axial thrust developed by the device is transmitted directly to the power chuck 13. While, as set forth hereinbefore, either arrangement of the actuator 10 may be used interchangeably with either of the collet 12 or the power chuck 13, the arrangement of the actuator 10 of FIG. 4 will be described specifically in conjunction with the power chuck 13 to disclose an operative device for the full range of work holding means necessary to full use of the lathe 11. In order to avoid needless repetition of the elements of the actuator 10 described hereinbefore only those elements which are necessary for the use of the device as a direct drive unit will be described in conjunction with the arrangement thereof illustrated. It will be understood that the device illustrated at FIG. 4 is the device illustrated at FIG. 3 except for the non-use of the force multiplying means 100 and the push tube 109, and the alternative use of an end plate 280 and a push rod 295.

The end plate 280 is a circular disc having spaced inner and outer faces 281 and 282 respectively and a peripheral edge 283 having a diameter substantially the same as the outer cylindrical wall 238 of the outer end portion 225 of the cam ring 105, to which the end plate 280 is removably attached. The end plate 280 is undercut at its inner face 281 adjacent the peripheral wall 283 to receive the outer end portion 226 of the cam ring 105. The undercut portion includes a circumferential shoulder 284 having a diameter slightly less than that of its associated inner cylindrical wall 239 of the end portion 226, and an annular face 285 extending outwardly from the shoulder 284 and which is adapted to abuttingly receive the end face 240 of the outer end portion 226. The end plate 280 is provided with a central threaded opening 286 therethrough and is removably attached to the outer end portion 226 of the cam ring 105 by three cap screws 287 (only one of which is shown at FIG. 4) which are engaged through counterbored openings provided through the end plate 280 at the undercut portion thereof, and into threaded engagement with corresponding threaded sockets provided in the end portion 226. Referring to FIG. 2, it will be observed that the push rod 295 has an elongated cylindrical form, and is provided with an external threaded portion 296 at its outer end and a threaded socket portion 297 at its inner end. The external threaded portion 296 is attached to the end plate 280 by threaded engagement in the central threaded opening 286, and has an axial extent which permits axial adjustment of the push rod 295 with respect to the end plate 280. The push rod 295 is maintained in a desired axial relationship with respect to the end plate 280 by a lock nut 297 which is threadedly engaged on the outwardly protruding portion of the externally threaded portion 296 and in tight bearing engagement with the outer face 282 of the end plate 280. The threaded socket portion 297 is arranged to receive the threaded shank portion 86 of the adapter sleeve 80 in a locked threaded engagement and thereby to directly interconnect the cam ring 105 and the grooved sleeve 73 of the power chuck 13 for conjoint axial and rotational movement. As thus interconnected, reciprocal axial movement of cam ring 105 operates to move the jaws 71 of the power chuck 13 between their open and closed positions, and the thrust developed by the primary drive elements operates to maintain the jaws in gripping engagement with a workpiece during a machining operation. Bearing in mind that the five characteristics of the actuator 10, enumerated hereinbefore, also fully describe the arrangement of the actuator 10 illustrated at FIG. 4, it will be appreciated that the manual operation of changing the actuator 10 from the arrangement to the other is readily accomplished without any alteration in the basic structure itself. For example, to change the actuator 10 from the arrangement of FIG. 3 to the arrangement of FIG. 4 requires merely the removal of the push tube 109 by releasing and unthreading it from its connection with the connecting sleeve 108, and the substitution therefor of the push rod 295 and the end plate 280. Conversely, the actuator 10 is easily converted from the arrangement of FIG. 4 to that of FIG. 3 by reversing this change procedure. In either case, as described hereinbefore, adjustments are easily made in the relative axial relationship of the traverse of the thrust producing members of the actuator 10 and the required axial traverse of the draw means of the collet 12 and the power chuck 13 to move the jaws thereof between their open and work gripping position. These adjustments may be made during the operation of changing the device from one arrangement to the other, and also when the work holding means itself is changed without changing the arrangement of the actuator 10. Referring further to the arrangement of FIG. 4, it is important to note that the device produces an equal axial thrust through the push rod 295 both toward and away from the power chuck 13. This unique arrangement gives the actuator 10 a universal character in that it may be used with work holding means of both the "push" and "pull" types, and when used with power chucks, such as the power chuck 13, will operate the jaws to grip a workpiece both externally and internally.

While the foregoing particularly describes the presently preferred embodiment of my invention, it will be realized that numerous modifications and alterations may be made without departing from the scope of the subject matter of my invention as hereinafter claimed.

I claim:

1. In a machine tool having a rotatably driven tubular spindle arranged to mount work holding means comprising alternatively usable chuck means and collet means of the type having jaws which are moved between open and closed positions by axial movement of a centrally disposed draft means between corresponding first and second axial positions; an actuator for forcedly moving the draft means of the work holding means selectably between said first and said second axial positions and to maintain appropriate gripping engagement between the jaws thereof and a workpiece during a machining operation, the combination being characterized by a primary drive means comprising a housing member, an associated driven member arranged for cooperative reciprocal movement with respect to said housing member and along a traverse of at least the distance between said first and said second axial positions of the draft means, and controlled power means for forcedly moving said driven member through said traverse; first thrust bearing means coaxially interconnecting said housing with the lathe spindle to rotatably isolate said primary drive means while constraining said housing member from axial movement with respect thereto; a cam ring member interconnected with said driven member by an associated second thrust bearing means to permit unconstrained rotation of said cam ring while maintaining a conjoint axial relationship therebetween; an elongated rigid member extending through the tubular spindle from the draft means of said work holding means to adjacent said cam ring, said elongated rigid member having means at the end thereof at the draft means for releasably connecting said elongated rigid member thereto; transmission means cooperably interconnecting said cam ring and the end portion of said elongated rigid member adjacent thereto, said transmission means comprising alternatively engageable direct fastening means and force multiplying means, whereby when said direct fastening means is engaged the axial thrust of said primary drive means is transmitted directly to the draft means, and when said force multiplying means is selectably engaged, said axial thrust is ratably transmitted to the draft means as a thrust having a substantially greater force component than that of said axial thrust.

2. The invention set forth in claim 1 wherein said housing member and said associated driven member defining a fluid receiving cylinder and a cooperable piston, and said control power means comprises means selectably introducing fluid under pressure to said fluid receiving cylinder to forcably drive said driven member reciprocally through its traverse.

3. The invention set forth in claim 2 wherein said driven member has an elongated cylindrical tubular body and said piston is defined by an outwardly extending flange generally cylindrically thereon, said tubular body portion being cooperable with said housing member to enclose a portion of said cylinder, which cylinder defines an annular chamber, and said flange is arranged for sliding movement within said chamber and between positions adjacent the axial ends thereof.

4. The invention set forth in claim 3 wherein said means introducing fluid under pressure to said fluid receiving cylinder comprises a source of compressed air, a three-way valve receiving said compressed air and selectably operable to direct said compressed air to a first port and a second port, a pair of fluid conducting conduits for transmitting said compressed air to said cylinder, one said conduit communicatably interconnecting said first port and one end of said cylinder, and the other said conduit communicatably interconnecting said second port and the other end of said cylinder, whereby when said three-way valve is manipulated to direct compressed air to said first port said piston is driven away from said one end of said cylinder, and alternatively said three-way valve is manipulated to direct compressed air to said second port said piston is driven along its said traverse away from said other end of said cylinder.

5. The invention set forth in claim 1 wherein said first thrust bearing means includes an outer race portion rigidly mounting said housing member, and an inner race portion includes a collar portion for removably attaching said actuator to the lathe spindle, and at least two equi-circumferentially spaced tabs supportedly mounting the operative member of said force multiplying means.

6. The invention set forth in claim 5 wherein said force multiplying means comprises at least two bell crank members mounted respectively on said tabs for limited oscillatory movement with respect thereto, each bell crank member having a radially extended finger portion and a heel portion, an internal cam surface provided on said cam ring and arranged to cammedly engage each said finger portion as said cam ring is driven through its axial traverse, said cam surface being arranged to move said bell crank members rotatably with respect to its traverse and pivotally between first and second angularly spaced positions, and a disengageable ring member conjointly attached to said elongated rigid member and having a radially extending face adapted to bearingly receive said heel portion, whereby said elongated rigid member is forcably driven in an axial direction by force applied through said heel portion to said face as said bell crank members are pivotally driven between said first and said second angular positions by said cam ring, the axial force component imparted to said elongated rigid member being substantially greater than the axial force produced by said primary drive means.

7. The invention set forth in claim 6 wherein said cam surface includes a linear portion which is parallel to the central axis of the lathe spindle and actuator which is mounted coaxially thereon, said linear portion being arranged to engage said finger of each said bell crank at the portion of the axial traverse of said cam surface corresponding to a closed position of the interconnected work holding means, whereby when the work holding means is in its closed position to grip a workpiece therewithin there is no axial force imposed on said actuator, and all of the reactive force maintaining the work holding means in its work gripping position is borne directly through said collar portion between lathe spindle.

8. The invention set forth in claim 7 wherein said housing member and said associated driven member defining fluid receiving cylinder and a cooperable piston, and said controlled power means comprises means introducing fluid under pressure to said fluid receiving cylinder to forcably drive said driven member reciprocally through its traverse.

References Cited

UNITED STATES PATENTS

| | | | |
|---|---|---|---|
| 1,656,624 | 1/1928 | Finsen | 279—4 XR |
| 3,289,504 | 12/1966 | Bergonzo | 279—4 XR |
| 3,361,433 | 1/1968 | Holdridge | 279—4 |

FOREIGN PATENTS

| | | |
|---|---|---|
| 736,614 | 1932 | France. |

ROBERT C. RIORDON, Primary Examiner

D. D. EVENSON, Assistant Examiner